United States Patent
Mathur

(12) United States Patent (10) Patent No.: US 11,144,612 B1
Mathur (45) Date of Patent: Oct. 12, 2021

(54) AUTOMATIC HYPERLINKING FOR CONTENT SERVICES

(71) Applicant: Citrix Systems, Inc., Fort Lauderdale, FL (US)

(72) Inventor: Nitin Kumar Mathur, Fort Lauderdale, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 1 day.

(21) Appl. No.: 16/841,846

(22) Filed: Apr. 7, 2020

(51) Int. Cl.
| | |
|---|---|
| *G06F 16/00* | (2019.01) |
| *G06F 16/955* | (2019.01) |
| *G06F 40/205* | (2020.01) |
| *G06F 16/9038* | (2019.01) |
| *G06F 16/903* | (2019.01) |
| *G06F 16/93* | (2019.01) |

(52) U.S. Cl.
CPC ...... *G06F 16/9558* (2019.01); *G06F 16/9038* (2019.01); *G06F 16/90335* (2019.01); *G06F 16/94* (2019.01); *G06F 16/9566* (2019.01); *G06F 40/205* (2020.01)

(58) Field of Classification Search
CPC ........................................................ G06F 16/94
See application file for complete search history.

(56) References Cited

U.S. PATENT DOCUMENTS

| | | | |
|---|---|---|---|
| 2013/0007053 A1* | 1/2013 | Yun | G06Q 30/0601 707/769 |
| 2016/0277368 A1* | 9/2016 | Narayanaswamy | H04L 63/0281 |

\* cited by examiner

*Primary Examiner* — Ajith Jacob
(74) *Attorney, Agent, or Firm* — Hoffman Warnick LLC

(57) ABSTRACT

A system and method system for providing auto-hyperlinking in endpoint content. A system includes email clients installed on remote client devices and managed by an application management service. The system further includes an auto-hyperlinking system having: a configuration file that regular expressions (regex's), wherein each regex is associated with an application and a URL template, and wherein each regex is coded to identify a string and parse an associated parameter; and a process that modifies an inputted email including: searching the inputted email for an email text string specified by the set of regex's; in response to locating a matching email text string as specified by an associated regex, parsing the matching email text string to extract a parameter value; and converting the email text string within the inputted email into a hyperlink based on an associated URL template, wherein the hyperlink includes the parameter value.

20 Claims, 6 Drawing Sheets

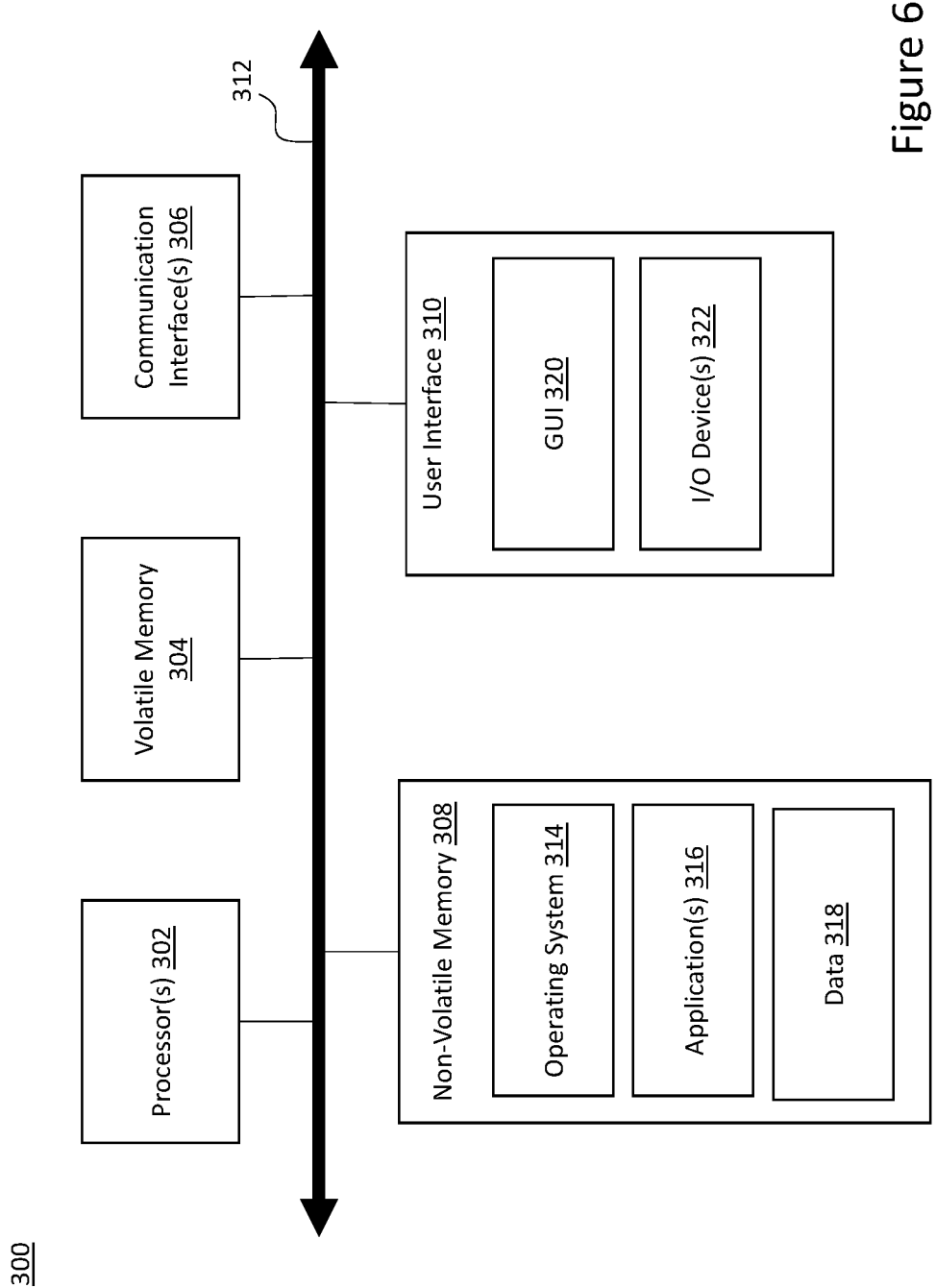

AUTOMATIC HYPERLINKING FOR CONTENT SERVICES

BACKGROUND OF THE DISCLOSURE

Email platforms and other types of electronic content services continue to dominate the manner in which enterprises communicate. Often, hyperlinks are included in composed content to allow a reader to quickly access a resource. In some cases, a hyperlink points to a resource that specifies an application and a parameter value. For example, the hyperlink could specify: a project management tool and an identifier (ID) that references an open issue; a document viewer application and a document name to be viewed; a media player application and a video title; etc. In email messages, for example, a composed message may include many such hyperlinks, e.g., to specify a list of issues associated with a product release.

Hyperlinks typically include a long string of formatted HTML (hypertext markup language) characters that must be accurately entered in the message. While copying and pasting can facilitate the process of composing such a message, including hyperlinks remains a relatively manual process and can be error prone. Further, the readability of messages that include many long hyperlinks can be challenging, particularly on mobile devices.

BRIEF DESCRIPTION OF THE DISCLOSURE

Aspects of this disclosure provide a system and method that provides an auto-hyperlinking solution in which the composer of content need only specify a brief text string (indicative of an application) and an associated parameter value when composing messages. A hyperlink is automatically added to the message based on the detected string and associated parameter value.

A first aspect of the disclosure provides a system that includes a plurality of email clients installed on remote client devices and managed by an application management service, wherein each remote client device includes a memory and a processor. Also provided is an auto-hyperlinking system stored in the memory with each email client. The auto-hyperlinking system includes: a configuration file that specifies a set of regular expressions (regex's), wherein each regex is associated with an application and a URL template, and wherein each regex is coded to identify a string and parse an associated parameter. The auto-hyperlinking system further includes a process executable by the processor that modifies an inputted email according to a method that includes: searching the inputted email for an email text string specified by the set of regex's; in response to locating a matching email text string as specified by an associated regex, parsing the matching email text string to extract a parameter value; and converting the email text string within the inputted email into a hyperlink based on an associated URL template, wherein the hyperlink includes the parameter value.

A second aspect discloses auto-hyperlinking system for a remote client service. The auto-hyperlinking system includes configuration settings that specify a set of regular expressions (regex's), wherein each regex is associated with an application and a URL template, and wherein each regex is coded to identify a string and parse an associated parameter. The auto-hyperlinking system further includes a process that modifies content associated with a remote client service according to a method that includes: searching text content associated with the remote client service for at least one text string specified by the set of regex's; in response to locating a matching text string as specified by an associated regex, parsing the matching text string to extract a parameter value; and converting the text string within the text content into a hyperlink based on an associated URL template, wherein the hyperlink includes the parameter value.

A third aspect of the disclosure provides a computerized method. The method includes providing configuration settings for a remote client service, wherein the configuration settings specify a set of regular expressions (regex's), wherein each regex is associated with an application and a URL template, and wherein each regex is coded to identify a string and parse an associated parameter. The method further includes: searching text content associated with the remote client service for at least one text string specified by the set of regex's; in response to locating a matching text string as specified by an associated regex, parsing the matching text string to extract a parameter value; and converting the text string within the text content into a hyperlink based on an associated URL template, wherein the hyperlink includes the parameter value.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 6 depicts a computing system, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments disclose technical solutions to provide automatic hyperlinking ("auto-hyperlinking") for content in remote client services running within an application management platform. The solutions improve the technical operation of remote client services by intelligently recognizing applications referenced in composed content and automatically converting the references to hyperlinks. Examples of such services include email applications, blog applications, documentation applications, word processors, chat platforms, texting applications, etc.

Figure 1:
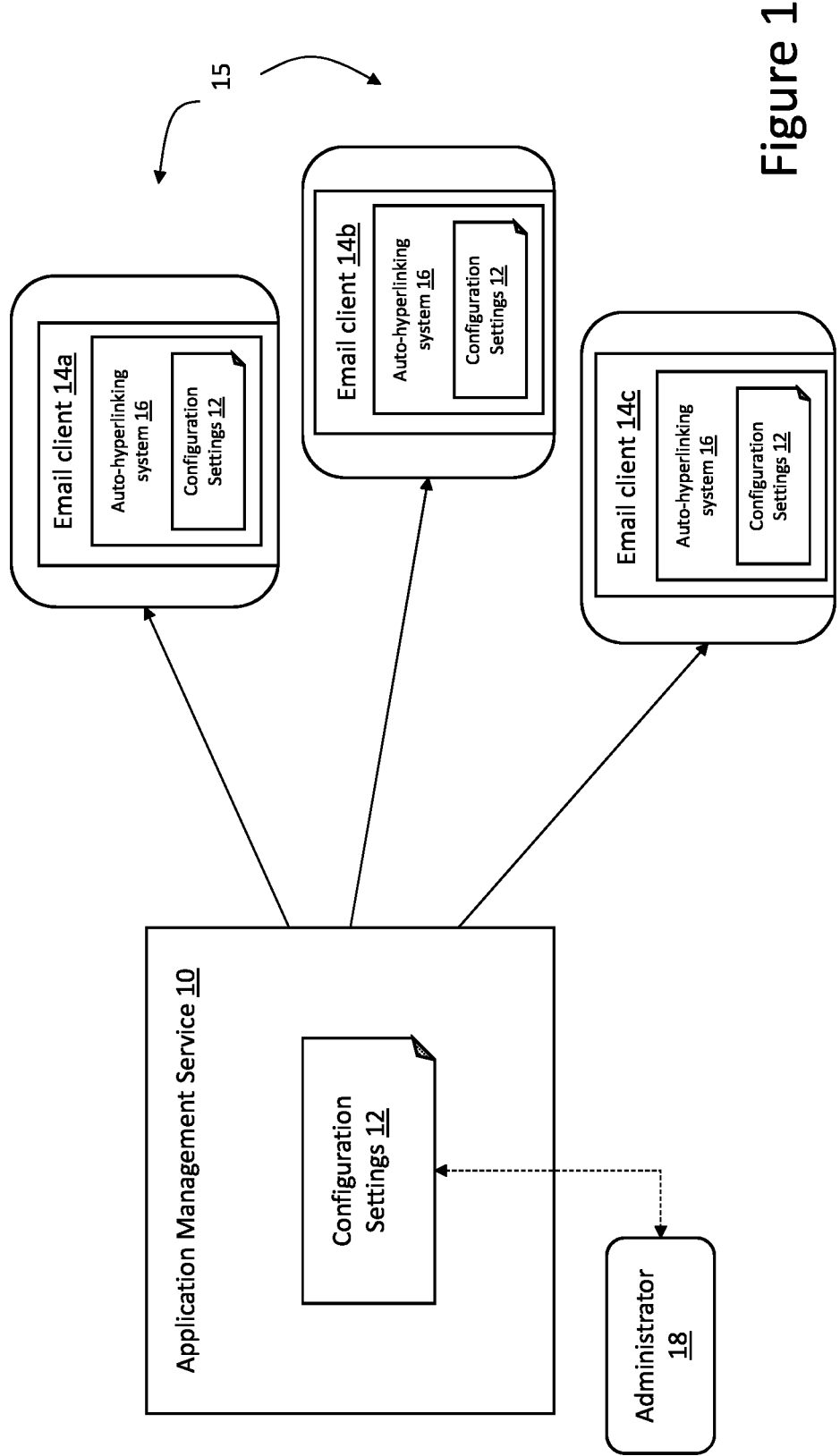
FIG. 1 depicts an application management service, in accordance with an illustrative embodiment.

FIG. 1 depicts an illustrative application management service 10 that provides remote device and application management. Namely, application management service 10 deploys and manages applications for endpoint devices 15 via an enterprise platform, e.g., providing email, word processing, etc., for mobile devices within an organization. An example of such a service is Citrix® Endpoint Management™, which is commercially available from Citrix Systems of Fort Lauderdale, Fla. in the United States.

In the example shown in FIG. 1, application management service 10 has deployed and is managing a set of email clients 14a, 14b, and 14c that reside on endpoint devices 15 (e.g., smartphones, laptops, desktops, etc.). Each email client includes an auto-hyperlinking system 16 that will automatically insert hyperlinks into a message based on configuration settings 12 deployed by the application management service 10. Configuration settings 12 may for example be updated and deployed (e.g., pushed) by an administrator 18 to each endpoint device 15, e.g., during an enrollment process of a new user or endpoint device 15, or from time to time thereafter as updates are required. Configuration settings 12 dictate when and how text strings should be converted into a hyperlink in an email message being composed. In an alternative approach, rather than deploying the configuration settings 12 to each endpoint device 15, the settings 12 can be accessed directly from the application management service 10 by each endpoint device 15 anytime an auto-hyperlinking process is initiated.

Figure 2:
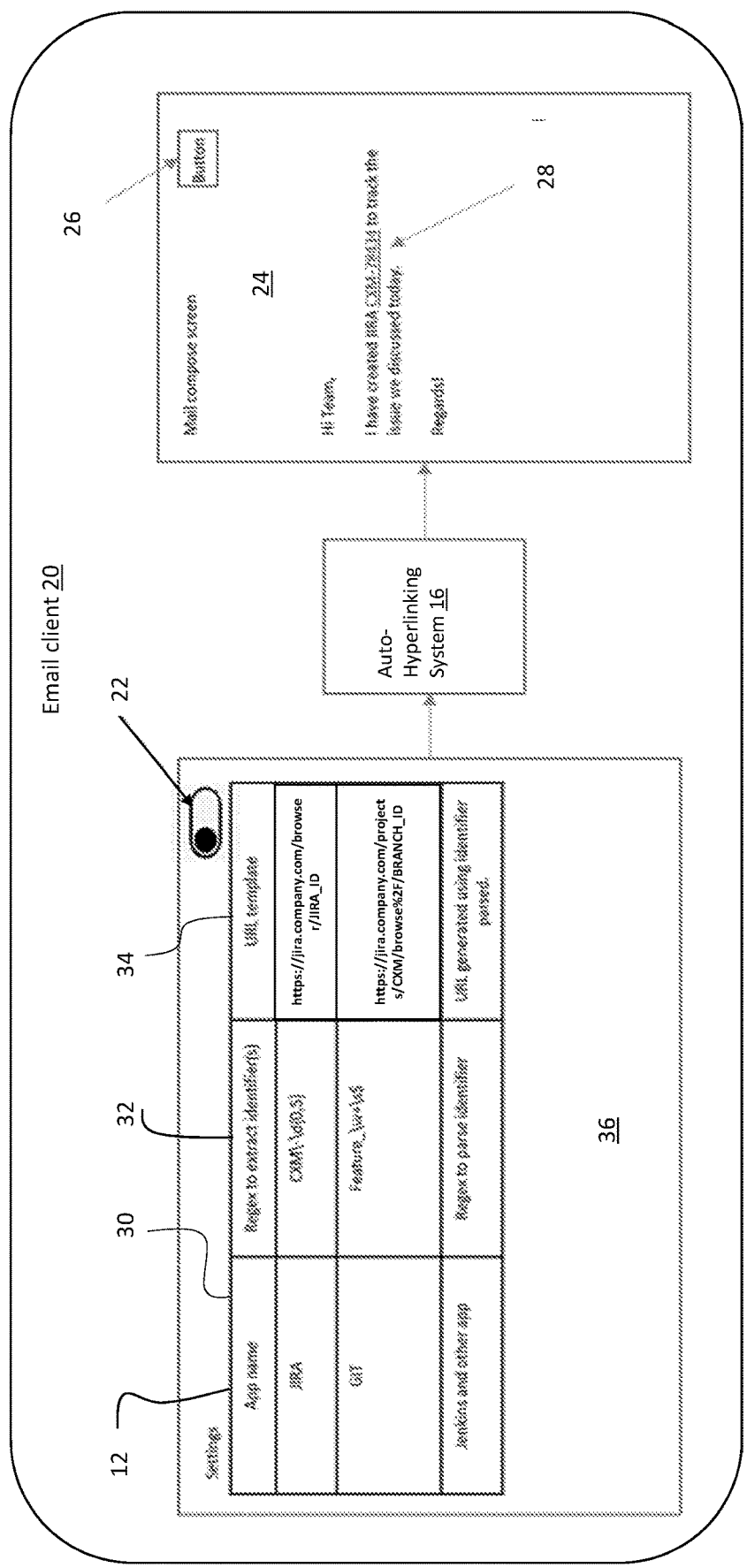
FIG. 2 depicts a use case showing a configuration file and email screen, in accordance with an illustrative embodiment.

FIG. 2 depicts an example of an auto-hyperlinking system 16 operating within an email client 20. As shown, a configuration file 36 is provided that includes configuration settings 12. In this example, the configuration file 36 includes a toggle 22 that allows a user to enable and disable the auto-hyperlinking system 16. Configuration settings 12 provide three fields including an App name field 30, a regex (regular expression) field 32, and a URL (uniform resource locator) template field 34. The App name field 30 specifies the application name for which auto-hyperlinking is to be utilized. In this embodiment, the App name field 30 does not provide any functionality, but rather orients the administrator or end user when viewing the settings 12. The regex field 32 provides a code for each application that defines a search pattern. The auto-hyperlinking system 16 uses the regex to identify and parse text strings in an email message 24.

For example, the regex CXM\-\d(0,5) that appears for the application JIRA, specifies a search pattern for "CXM-" followed by a five digit parameter which is captured in the variable d(0,5). An associated URL template 34 provides a URL address that is used to replace a matched search pattern. In addition to an address, each URL template includes a variable placeholder, such as JIRA_ID, that is replaced with a captured parameter value when a regex match is detected.

In the example shown, a text string 28 with the characters "CXM-78434" was typed into email message 24, which triggered a match with "CXM-" in the regex for the JIRA application. The regex then parsed the string 28 to extract the parameter value 78434. Once extracted, the auto-hyperlinking system 16 causes the string 28 to be converted into a hyperlink that includes the URL address and captured parameter value, as specified by the associated URL template. In this case, a hyperlink is generated as follows: https://jira.company.com/browser/78434. In an alternative approach, the parameter could include the entire text string 28. For example, the hyperlink URL could be https://jira.company.com/browser/CXM-78434, in which the entire string is the parameter.

Note that in this embodiment, the actual URL address of the hyperlink is not displayed. Instead, the original text string 28 is displayed as hypertext. Hypertext includes highlighted or underlined text that a user can see and click on to activate a hidden hyperlink.

In the illustrative embodiment of FIG. 2, a button 26 is provided in the email message screen. When the user is ready to send the email message, the user clicks the button 26, which causes the auto-hyperlinking system 16 to automatically search for strings that can be replaced based on the configuration settings 12. (It is understood that interactive interface elements other than a button 26 in the message body could alternatively be used, e.g., a display feature in the email toolbar could be provided.) In an alternative embodiment, rather than using a button 26 or the like to trigger auto-hyperlinking, the process could be done on the fly as the user composes the email.

Figure 3:
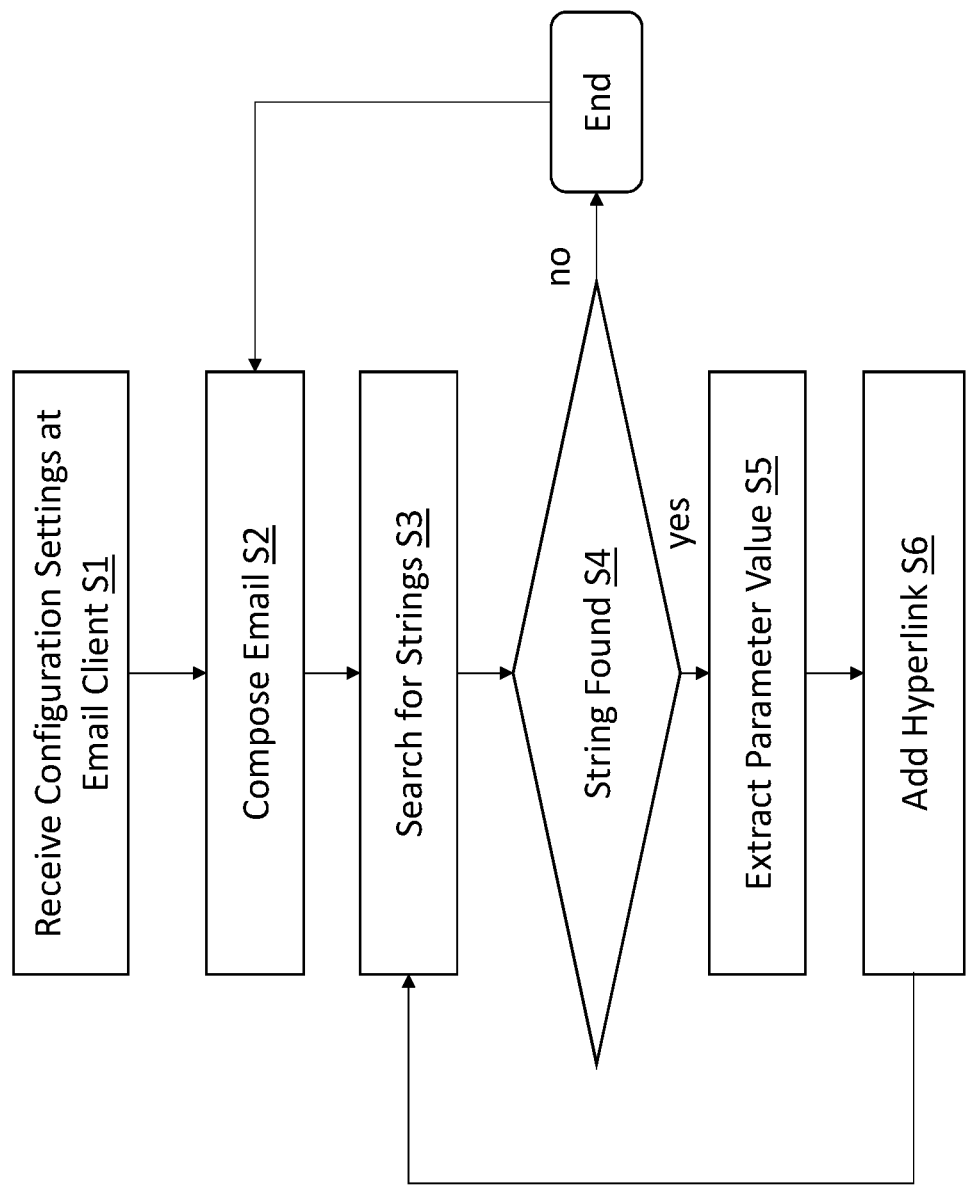
FIG. 3 depicts a flow diagram of a method of implementing auto-hyperlinking, in accordance with an illustrative embodiment.

FIG. 3 depicts a flow diagram of an illustrative process for implementing auto-hyperlinking. At S1, configuration settings 12 are received and saved at an email client, for example during an enrollment process by the application management service 10. (As noted, in an alternative approach, the configuration settings 12 can remain at the application management service 10, and be accessed remotely as needed by the email client.) At S2, the user composes an email message and then activates the auto-hyperlinking system 16, e.g., via an interface element such as button 26. At S3, the email message is searched to locate strings that match any of the regex's specified in the configuration settings 12. If no string is found at S4, the process ends until a next email message is composed. If a string is found at S4, an associated parameter value is extracted from the email message at S5 and the matching text is converted to a hyperlink based on the associated URL template in the configuration settings 12. The hyperlink include a URL address and the extracted parameter value. As noted, a hypertext version of the original string may be displayed that the user can click on to activate the hyperlink. The process repeats to look for and process other strings at S3-S6 until no more strings are found.

Note that while the embodiments described herein have been directed at email messages, it is understood that the auto-hyperlinking system 16 described herein could be utilized in any client service in which text content is shared among users, e.g., blog applications, documentation applications, word processors, chat platforms, texting applications, etc.

Figure 4:
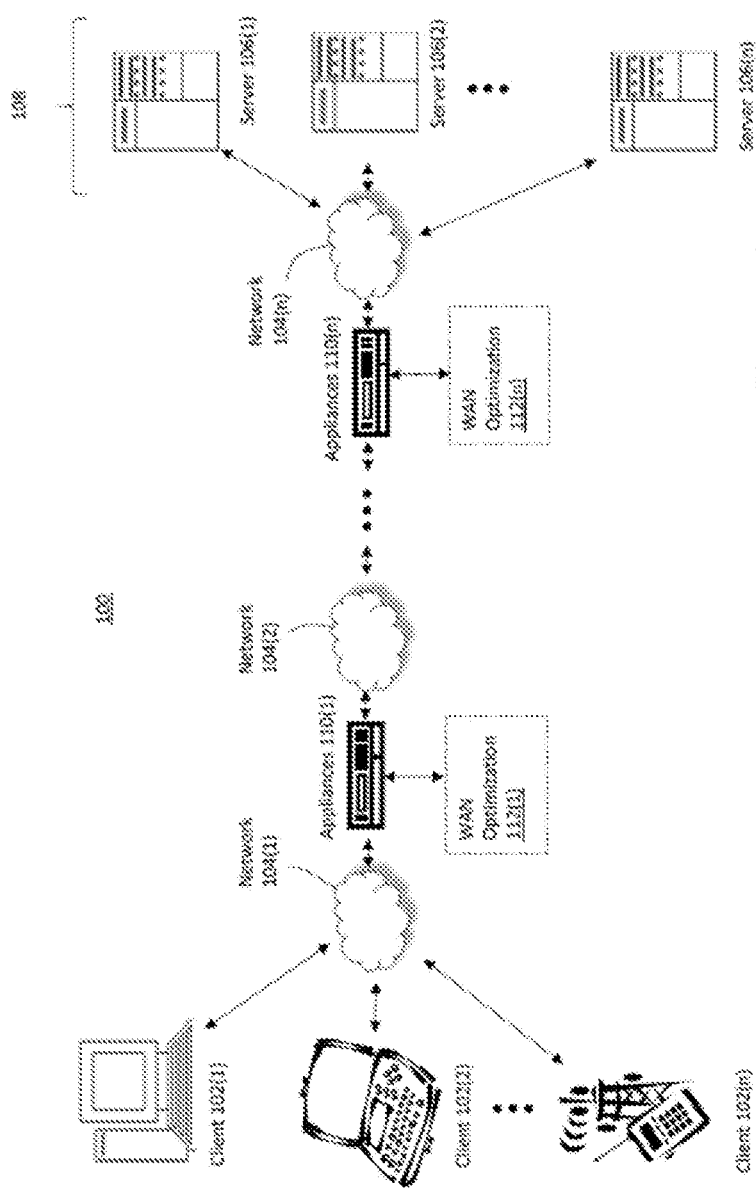
FIG. 4 depicts a network infrastructure, in accordance with an illustrative embodiment.

Referring to FIG. 4, an illustrative network environment 100 is depicted for implementing the application management service 10. Network environment 100 may include one or more clients 102(1)-102(n) (also generally referred to as local machine(s) 102, "client devices" or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 110(1)-110n (generally referred to as appliance(s) 110 or gateway(s) 110).

Although the embodiment shown in FIG. 4 shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 4, one or more appliances 110 may be located at various points or in various communication paths of network environment 100. For example, appliance 110(1) may be deployed between two networks 104(1) and 104(2), and appliances 110 may communicate with one another to work in conjunction to, for example, accelerate network traffic between clients 102 and servers 106. In other embodiments, the appliance 110 may be located on a network 104. For example, appliance 110 may be implemented as part of one of clients 102 and/or servers 106. In an embodiment, appliance 110 may be implemented as a network device such as Citrix networking (formerly NetScaler®) products sold by Citrix Systems, Inc. of Fort Lauderdale, Fla.

As shown in FIG. 4, one or more servers 106 may operate as a server farm 108. Servers 106 of server farm 108 may be logically grouped, and may either be geographically co-located (e.g., on premises) or geographically dispersed (e.g., cloud based) from clients 102 and/or other servers 106. In an embodiment, server farm 108 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 4, in some embodiments, appliances 110 may include, be replaced by, or be in communication with, one or more additional appliances, such as WAN optimization appliances 112(1)-112(n), referred to generally as WAN optimization appliance(s) 112. For example, WAN optimization appliance 112 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 112 may be a performance enhancing proxy or a WAN optimization controller. In one embodiment, appliance 112 may be implemented as Citrix SD-WAN products sold by Citrix Systems, Inc. of Fort Lauderdale, Fla.

Figure 5:
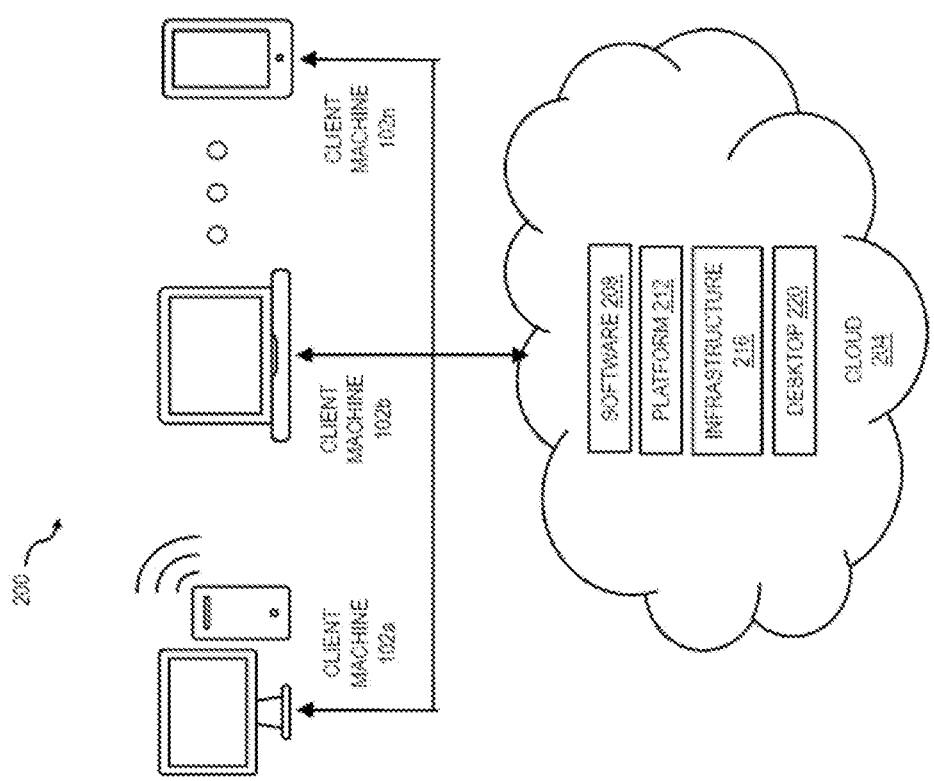
FIG. 5 depicts a cloud computing diagram, in accordance with an illustrative embodiment.

Referring to FIG. 5, a cloud computing environment 200 is depicted, which may also be referred to as a cloud environment, cloud computing or cloud network. The cloud computing environment 200 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 200, one or more clients 102a-102n (such as those described above) are in communication with a cloud network 204. The cloud network 304 may include back-end platforms, e.g., servers, storage, server farms or data centers. The users or clients 102a-102n can correspond to a single organization/tenant or multiple organizations/tenants. More particularly, in one example implementation the cloud computing environment 200 may provide a private cloud serving a single organization (e.g., enterprise cloud). In another example, the cloud computing environment 200 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 200 may provide a hybrid cloud that is a combination of a public cloud and a private cloud. Public clouds may include public servers that are maintained by third parties to the clients 102a-102n or the enterprise/tenant. The servers may be located off-site in remote geographical locations or otherwise.

The cloud computing environment 200 can provide resource pooling to serve multiple users via clients 102a-102n through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 200 can provide on-demand self-service to unilaterally provision computing capabilities (e.g., server time, network storage) across a network for multiple clients 102a-102n. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 200 can provide an elasticity to dynamically scale out or scale in response to different demands from one or more clients 102. In some embodiments, the cloud computing environment 200 can include or provide monitoring services to monitor, control and/or generate reports corresponding to the provided shared services and resources.

In some embodiments, the cloud computing environment 200 may provide cloud-based delivery of different types of cloud computing services, such as Software as a service (SaaS) 208, Platform as a Service (PaaS) 212, Infrastructure as a Service (IaaS) 216, and Desktop as a Service (DaaS) 220, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash. (herein "Azure"), or AMAZON WEB SERVICES provided by Amazon.com, Inc., of Seattle, Wash. (herein "AWS"), for example. In the case of Citrix Cloud, Citrix Workspace app may be used as a single-entry point for bringing apps, files and desktops together (whether on-premises or in the cloud) to deliver a unified experience.

In described embodiments, clients 102, servers 106, and appliances 110 and 112 may be deployed as and/or executed on any type and form of computing device, such as any desktop computer, laptop computer, or mobile device capable of communication over at least one network and performing the operations described herein. For example, clients 102, servers 106 and/or appliances 110 and 112 may each correspond to one computer, a plurality of computers, or a network of distributed computers such as computing system 300 shown in FIG. 6. Computing system 300 may for example be implemented by a cloud computing environment that employs a network of remote, hosted servers to manage, store and/or process data, and may generally be referred to, or fall under the umbrella of, a "network service."

Elements of the described solution may be embodied in a computing system, such as that shown in FIG. 6 in which a computer 300 may include one or more processors 302, volatile memory 304 (e.g., RAM), non-volatile memory 308 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 310, one or more communications interfaces 306, and communication bus 312. User interface 310 may include graphical user interface (GUI) 320 (e.g., a touchscreen, a display, etc.) and one or more input/output (I/O) devices 322 (e.g., a mouse, a keyboard, etc.). Non-volatile memory 308 stores operating system 314, one or more applications 316, and data 318 such that, for example, computer instructions of operating system 314 and/or applications 316 are executed by processor(s) 302 out of volatile memory 304. Data may be entered using an input device of GUI 320 or received from I/O device(s) 322. Various elements of computer 300 may communicate via communication bus 312. Computer 300 as shown in FIG. 6 is shown merely as an example, as clients, servers and/or appliances and may be implemented by any computing or processing environment and with any type of machine or set of machines that may have suitable hardware and/or software capable of operating as described herein.

Processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 306 may include one or more interfaces to enable computer 300 to access a computer network such as a LAN, a WAN, or the Internet through a variety of wired and/or wireless or cellular connections.

In described embodiments, a first computing device 300 may execute an application on behalf of a user of a client computing device (e.g., a client), may execute a virtual machine, which provides an execution session within which applications execute on behalf of a user or a client computing device (e.g., a client), such as a hosted desktop session, may execute a terminal services session to provide a hosted desktop environment, or may provide access to a computing environment including one or more of: one or more applications, one or more desktop applications, and one or more desktop sessions in which one or more applications may execute.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed:

1. A system, comprising:
   a plurality of email clients installed on remote endpoint devices and managed by an application management service, wherein each remote endpoint device includes a memory and a processor; and
   an auto-hyperlinking system stored in the memory with each email client, including:
   a configuration file that specifies a set of regular expressions (regex's), wherein each regex is associated with an application and a URL template, and wherein each regex is coded to identify a string and parse an associated parameter; and
   a process executable by the processor that modifies an inputted email according to a method that includes:
   searching the inputted email for an email text string specified by the set of regex's;
   in response to locating a matching email text string as specified by an associated regex, parsing the matching email text string to extract a parameter value; and
   converting the email text string within the inputted email into a hyperlink based on an associated URL template, wherein the hyperlink includes the parameter value.

2. The system of claim 1, wherein the auto-hyperlinking system further includes a user interface element that allows a user to manually trigger modification of the inputted email according to the method.

3. The system of claim 2, wherein the user interface element includes a button that appears in a body of the inputted email.

4. The system of claim 1, wherein modification of the inputted email according to the method is performed automatically as a user enters text.

5. The system of claim 1, wherein the configuration file is automatically pushed to each email client by the application management service.

6. The system of claim 1, wherein the configuration file includes a toggle to activate and deactivate the process that modifies inputted emails.

7. The system of claim 1, wherein the hyperlink includes a hypertext version of the email text string in the inputted email.

8. An auto-hyperlinking system, comprising:
   at least one processor; and
   at least one computer-readable medium storing a configuration file that specifies a set of regular expressions (regex's), each regex being associated with an application and a URL template, and each regex being coded to identify a string and parse an associated parameter, and storing instructions that when executed by the at least one processor, cause the auto-hyperlinking system to modify content associated with a remote client service by:
   searching text content associated with the remote client service for at least one text string specified by the set of regex's;
   in response to locating a matching text string as specified by an associated regex, parsing the matching text string to extract a parameter value; and
   converting the text string within the text content into a hyperlink based on an associated URL template, wherein the hyperlink includes the parameter value.

9. The system of claim 8, wherein the auto-hyperlinking system further includes a user interface element that allows a user to manually trigger modification of the content according to the method.

10. The system of claim 9, wherein the user interface element includes a button.

11. The system of claim 8, wherein modification of the content according to the method is performed automatically as a user enters text within the remote client service.

12. The system of claim 8, wherein the configuration settings are automatically pushed to a plurality of remote clients running the remote client service by an application management service.

13. The system of claim 8, wherein the configuration settings include a toggle to activate and deactivate the process that modifies content.

14. The system of claim 8, wherein the remote client service includes one of: an email application, a blog application, a documentation application, a word processor, a chat platform, or a texting application.

15. A computerized method, comprising:
    providing configuration settings for a remote client service, wherein the configuration settings specify a set of regular expressions (regex's), wherein each regex is associated with an application and a URL template, and wherein each regex is coded to identify a string and parse an associated parameter;
    searching text content associated with the remote client service for at least one text string specified by the set of regex's;
    in response to locating a matching text string as specified by an associated regex, parsing the matching text string to extract a parameter value; and
    converting the text string within the text content into a hyperlink based on an associated URL template, wherein the hyperlink includes the parameter value.

16. The method of claim 15, wherein searching text content for at least one application identifier is triggered manually in response to a user action.

17. The method of claim 15, wherein searching text content for at least one application identifier is triggered automatically as a user enters text within the remote client service.

18. The method of claim 15, wherein the configuration settings are automatically pushed to a plurality of remote clients running the remote client service by an application management service.

19. The method of claim 15, wherein the configuration settings are included in a configuration file that includes a toggle to activate and deactivate the process that modifies content.

20. The method of claim 15, wherein the remote client service includes one of: an email application, a blog application, a documentation application, a word processor, a chat platform or a texting application.

* * * * *